(12) United States Patent
Rehkopf

(10) Patent No.: US 6,505,249 B1
(45) Date of Patent: Jan. 7, 2003

(54) METHOD FOR OPTIMIZING END-TO-END PROCESSING PERFORMANCE BY SELECTING OPTIMAL VALUES AFTER RUNNING BENCHMARKS REPEATEDLY WITH DIFFERENT VALUES

(75) Inventor: Thomas William Rehkopf, Roswell, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/474,021

(22) Filed: Dec. 28, 1999

(51) Int. Cl.[7] .............................................. G06F 15/173
(52) U.S. Cl. ........................ 709/224; 702/182; 702/186
(58) Field of Search ................................. 709/223, 224, 709/101; 379/112.01; 702/182, 186; 705/11; 717/153; 370/232; 345/440; 703/13

(56) References Cited

U.S. PATENT DOCUMENTS

| | | | | |
|---|---|---|---|---|
| 5,764,740 A | * | 6/1998 | Holender | 379/112.01 |
| 5,838,919 A | * | 11/1998 | Schwaller et al. | 709/224 |
| 5,875,431 A | * | 2/1999 | Heckman et al. | 705/11 |
| 5,966,536 A | * | 10/1999 | Ravichandran | 717/153 |
| 5,978,851 A | * | 11/1999 | Kayama et al. | 370/232 |
| 6,067,412 A | * | 5/2000 | Blake et al. | 709/101 |
| 6,320,585 B1 | * | 11/2001 | Engel et al. | 345/440 |
| 6,324,495 B1 | * | 11/2001 | Steinman | 703/13 |

\* cited by examiner

Primary Examiner—Le Hien Luu
(74) Attorney, Agent, or Firm—Shaw Pittman LLP

(57) ABSTRACT

A method for benchmarking and optimizing the end-to-end processing performance of a computer network system that identifies performance variables that affect system performance, runs an initial performance test to establish a baseline value for each performance variable and a baseline performance value for the system, pins all performance variables to their constant baseline values except for one floating variable, incrementally changes the value of the floating variable, conducts a new performance test for each changed value, records the values of the system performance and the associated performance variables in a matrix, restores the floating variable to its baseline value, and repeats the prior steps for a new floating variable. The method proceeds until all performance variables have been tested as the floating variable and the matrix is complete. Using the matrix, a computer system designer can understand the performance variables that most affect system performance and can optimize hardware and software configurations.

21 Claims, 4 Drawing Sheets

| Test No. | Floating Variable | Environment Variables | | | Database Variables | | | Application Variables | | | Network Variables | | | System Perf. Indicators | | |
|---|---|---|---|---|---|---|---|---|---|---|---|---|---|---|---|---|
| | | # of CPUs | Amt of Mem | ... | SGA Size | Redo Logs | ... | # of Customers | # of Records | ... | Protocol | LAN Bandwidth | ... | Transaction Rate | Batch Rate | ... |
| baseline | none | a | b | ... | c | d | ... | f | g | ... | j | k | ... | m | n | ... |
| 1 | # of CPU | 2 | b | ... | c | d | ... | f | g | ... | j | k | ... | m1 | n1 | ... |
| 2 | # of CPU | 4 | b | ... | c | d | ... | f | g | ... | j | k | ... | m2 | n2 | ... |
| 3 | # of CPU | 8 | b | ... | c | d | ... | f | g | ... | j | k | ... | m3 | n3 | ... |
| . | . | . | . | | . | . | | . | . | | . | . | | . | . | |
| . | . | . | . | | . | . | | . | . | | . | . | | . | . | |
| . | . | . | . | | . | . | | . | . | | . | . | | . | . | |
| 100 | # of Recs. | a | b | | c | d | | f | 200 | | j | k | | m100 | n100 | |
| 101 | # of Recs. | a | b | | c | d | | f | 500 | | j | k | | m101 | n101 | |
| . | . | | | | | | | | | | | | | . | . | |
| . | . | | | | | | | | | | | | | . | . | |
| . | . | | | | | | | | | | | | | . | . | |
| N | | | | | | | | | | | | | | | | |

FIG. 3

METHOD FOR OPTIMIZING END-TO-END PROCESSING PERFORMANCE BY SELECTING OPTIMAL VALUES AFTER RUNNING BENCHMARKS REPEATEDLY WITH DIFFERENT VALUES

BACKGROUND

1. Field of the Invention

The present invention relates to client-server based computer systems, and more particularly, to a method for benchmarking and optimizing the end-to-end processing performance of a client-server based computer system to determine the optimal values of the system variables.

2. Background of the Invention

Virtually every large business today relies on a computer network system to manage information. Typically, these systems operate multiple software applications to handle business functions such as accounting, purchasing, inventory, work scheduling, and customer service. The businesses invest huge sums of money to develop custom networks that efficiently meet these specific functions. In return for such large investments, the businesses demand the fastest and most reliable systems possible.

Conscious of these demands, system designers attempt to predict system demands, such as the number and frequency of transactions or the number of concurrent users. Based on these predictions, the designers assemble hardware components capable of meeting the anticipated demands. As apparent to one skilled in the art, the process is often little more than an initial educated guess followed by trial and error. Considering the large number of applications a system is typically asked to support, this unfocused approach is seemingly unavoidable because of the sheer number of hardware and software variables involved in assembling a system.

Faced with such a large number of variables, system designers must first focus on making the system work. Unfortunately, multiple components manufactured by different companies and the applications layered on top of them introduce a limitless number of possible programming problems. By trial and error, system designers adjust relationships between hardware and software until a workable model is found. Often, ensuring proper communication between components and accomplishing overall system operation are the designers' only goals. Thus, designers are usually satisfied just to resolve programming problems and achieve system functionality, without even considering system efficiency.

If the system designers do set aside time and effort for system optimization, they typically focus on improving the performance of the individual system components. On the component level, designers can more easily understand and evaluate the variables affecting performance. In addition, the system designers can draw from the experiences and recommendations of individual component manufacturers. For instance, a hardware manufacturer, such as Hewlett Packard™, knows in detail the factors that improve or degrade hardware performance. Database engineers understand completely the optimal conditions for efficient performance of a database, such as Oracle™. Thus, typically designers optimize the performance of each of the components, incorporate the optimized components into the system, and expect that the overall system is operating at close to its most efficient capability. However, because these components depend heavily on each other and on the specific application of the system, this assumption is often incorrect. Plainly stated, optimized components do not always add up to an optimized system.

The strategy of component optimization is a relic of earlier monolithic processing environments. Monolithic refers to a network system designed, manufactured, and supported by a single manufacturer. In the early days of network computing, a single manufacturer supplied the network, was responsible for overall end-to-end processing performance and, as the designer of each component, had the knowledge of the individual components and the overall system to meet optimization needs. However, as the computer industry advanced and increased in complexity, manufacturers began to specialize and produce only a single component of a network. These manufacturers still furnished design and optimization support for customers, but only for their respective components. Thus, today, the customer, who is typically the resident network engineer of a business, is burdened with the responsibility of assembling optimized components that do not necessarily amount to an optimized network system.

SUMMARY OF THE INVENTION

The present invention is a method for evaluating and optimizing the performance of a client-server based computer network system. Specifically, the present invention provides a method for benchmarking the end-to-end processing performance of a computer network system comprised of individually manufactured components. The benchmarking method identifies performance-affecting system variables, measures their relative impacts on performance, and arrives at optimal settings for overall system optimization.

As most broadly defined, benchmarking is a way to measure the efficiency and effectiveness of computer system performance. Typically, benchmarking is used as part of wide scale information technology metrics, which is defined as the science of measuring the efficiency and effectiveness of computer hardware, software, and systems. Once a system is operational, an initial benchmark test is run in which the system performs the function for which it was designed. This benchmark test evaluates the performance of the system by some measurable unit, such as time or frequency of performance cycles. In addition, the benchmark test notes the respective values of the system variables.

As described above, these benchmarking tests are typically applied only to components of a computer network. As opposed to this component level strategy, the present invention assesses performance on a system-wide level, taking into account system component interrelationships. The present invention is primarily intended for actual computer network systems that are in use, and not necessarily to model systems. The present invention analyzes computer network systems devoted to particular applications, and identifies different system destabilizers for each system and each application. The present invention provides the following method of system performance benchmarking, which can be performed either manually, by system designers, or preferably automatically, by software executing the steps described herein.

First, a set of performance variables that impact system performance is identified. These performance variables, also referred to as system destabilizers, influence the performance of the software, hardware, and network processes. Examples of these variables include the number of central processing units (CPUs), the number of concurrent users, and the network protocols. Once the destabilizers are identified, a software matrix is constructed to represent and track the performance variables. Next, the functional (but not optimized) system is performance-tested. This initial performance test establishes the baseline for the system, which is recorded in the software matrix.

With a baseline established, the performance variables are pinned to constant values except for one variable, which is allowed to float through different values. While this one variable is floating, system performance is recorded in the software matrix, including metrics pertinent to the particular software application, such as processing speed, system access and congestion, and system response time. Readings for each value of the floating variable are recorded as the values change through successive thresholds.

Once a statistically complete sample has been taken, the floating variable is returned to its baseline value and the method is repeated with a new performance variable. A test sample is statistically complete when the test results demonstrate that a relationship between the floating variable and system performance does or does not exist, and demonstrates such a relationship to the degree of accuracy required by the specific application of the computer network system. After tracking the computer network's response to changes in value of the different system destabilizers, the present invention presents a clear picture of which variables improve or degrade system operation and, in addition, how each variable influences the performance of other variables. The relative impact of each variable is shown in the software matrix. Educated with this knowledge, a system designer can then implement system changes that address the most influential variables and optimize performance. For example, if the software matrix shows that the volume of records an application must process is the primary cause of slow system performance, then a designer may simply install faster processing hardware to solve the problem.

In the first step of the method of the present invention, choosing variables that affect end-to-end processing performance depends largely on the specific architecture, components, and application of the system. Generally though, these performance variables fall under four categories: environment variables, database variables, application variables, and network variables. Environment variables concern the physical configuration of the system and its components, including for example, the number of CPUs, the amount of memory, data striping (how data is physically placed across a disk array), and port configurations. Database variables pertain to the configuration and operation of a database and include variables such as buffer size, sort area, and shared pools. Application variables depend on the specific application being executed, but generally include variables such as transaction mix, transaction rate, array insert size, and number of concurrent users. Finally, network variables concern the methods of data exchange between computer network components, and include, for example, protocols and bandwidths. The relative influence on the system of these performance variables depends on the particular assembly of components and the applications the system executes.

The present invention can be applied to any client-server based computer network. However, in the preferred embodiment, the present invention is applied to a client-server system with an application tier, a database tier, and a client tier. In hardware terms, this system is a personal computer, such as a computer with an Intel™ processor, connected to a server, such as an Hewlett Packard HPT520, and a database, such as Oracle™.

Accordingly, it is an object of the present invention to optimize the performance of client-server based computer network systems.

It is another object of the present invention to provide a benchmark for the end-to-end processing performance of a computer network system, to identify the component variables, the network variables, and the processing environment variables that most affect overall system performance, and to determine the optimal values of those variables that produces the most efficient overall network system possible.

It is another object of the present invention to provide a computer system designer with an understanding of the variables affecting the performance of a computer network system composed of individually manufactured hardware and software.

It is another object of the present invention to provide means for determining the capacity of a network application, such as the number of concurrent users a network application can support.

These and other objects of the present invention are described in greater detail in the detailed description of the invention, the appended drawings, and the attached claims.

DESCRIPTION OF THE DRAWINGS

FIG. 3 is a schematic diagram of a matrix used to track system performance as a function of performance variables.

DETAILED DESCRIPTION OF THE INVENTION

The present invention is a method for benchmarking the end-to-end processing performance of a client-server computer network system. Broadly stated, the method involves the following steps: identifying performance variables that affect system performance; running an initial performance test to establish a baseline system performance for a particular value for each performance variable; pinning all variables to their constant baseline values except for one floating variable; incrementally changing the value of the floating variable, conducting a new performance test for each changed value, and recording the system performance and the associated variable values in a matrix; and restoring the floating variable to its baseline value and repeating the prior steps for a new floating variable. The method proceeds until all variables have been tested as the floating variable and the matrix is complete. Using the matrix, a computer system designer can understand the performance variables that most affect system performance and can modify hardware or software for optimization.

System Components

Figure 1A:
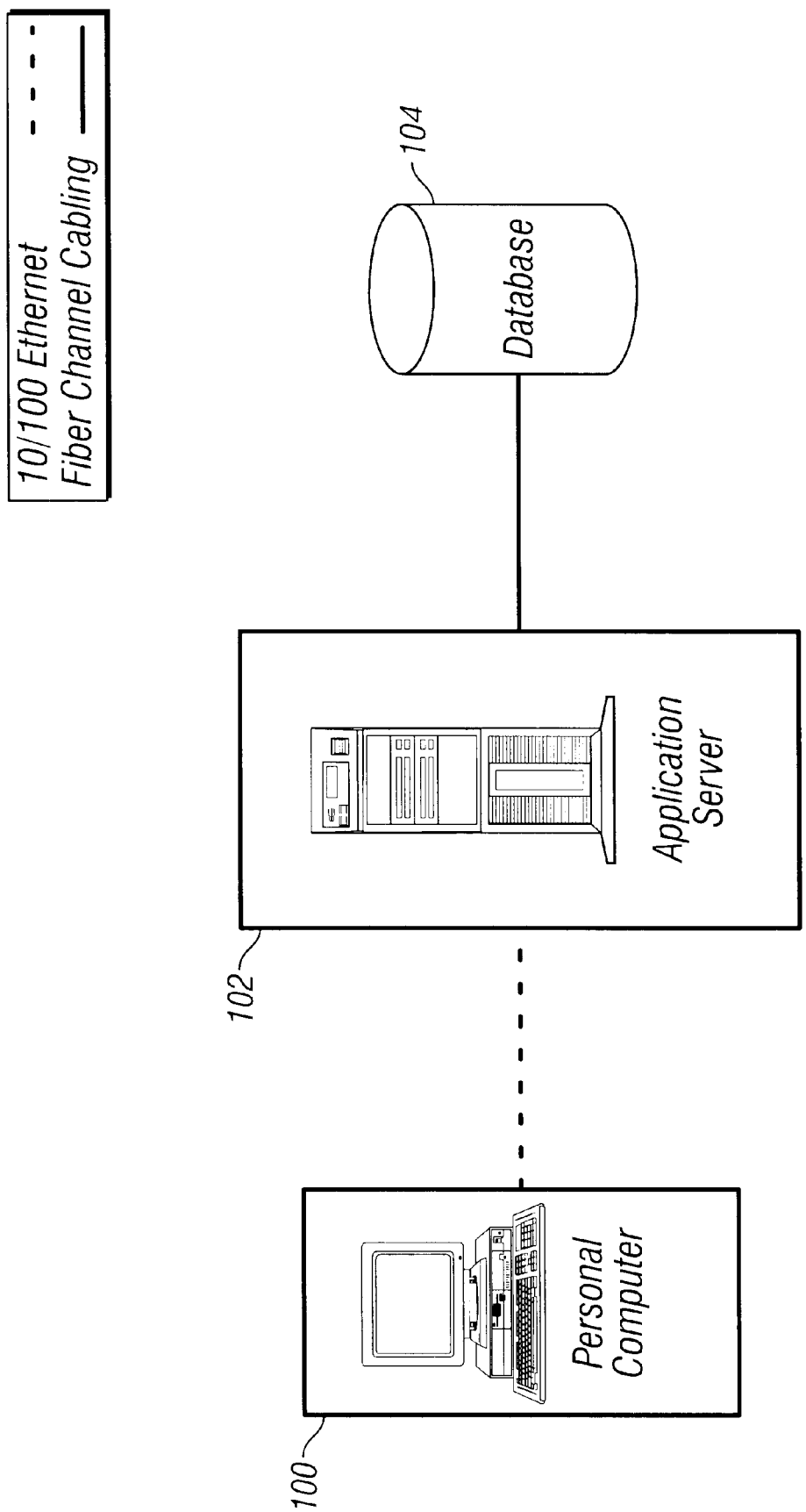
FIG. 1a is a schematic diagram of the system architecture of the present invention.

The present invention can be applied to any client-server computer network system. However, FIG. 1a shows the preferred embodiment of the present invention, having an application tier, a database tier, and a client tier. In this preferred embodiment, the client-server system is a personal computer (PC) 100 connected to an application server 102, which is connected to a database 104. PC 100 is a computer workstation, e.g., an Intel™ workstation running on WindowsNT™. PC 100 must possess the minimum configuration required to support a given application, e.g., a Pentium II processor, 200 megahertz clock speed, 64 megabytes RAM, 2 gigabytes disk space configuration. PC 100 is connected to application server 102 through a 10/100 Ethernet connection. Application server 102 is, for example, a Hewlett Packard HPT520 connected to database 104 through fiber channel cabling, or optionally through standard cabling. Database 104 is, for example, an Oracle™ database with disk storage manufactured by EMC Corporation (e.g., model EMC Symmetrix 3500, Raid-S, 750 gigabytes usable storage).

Figure 1B:
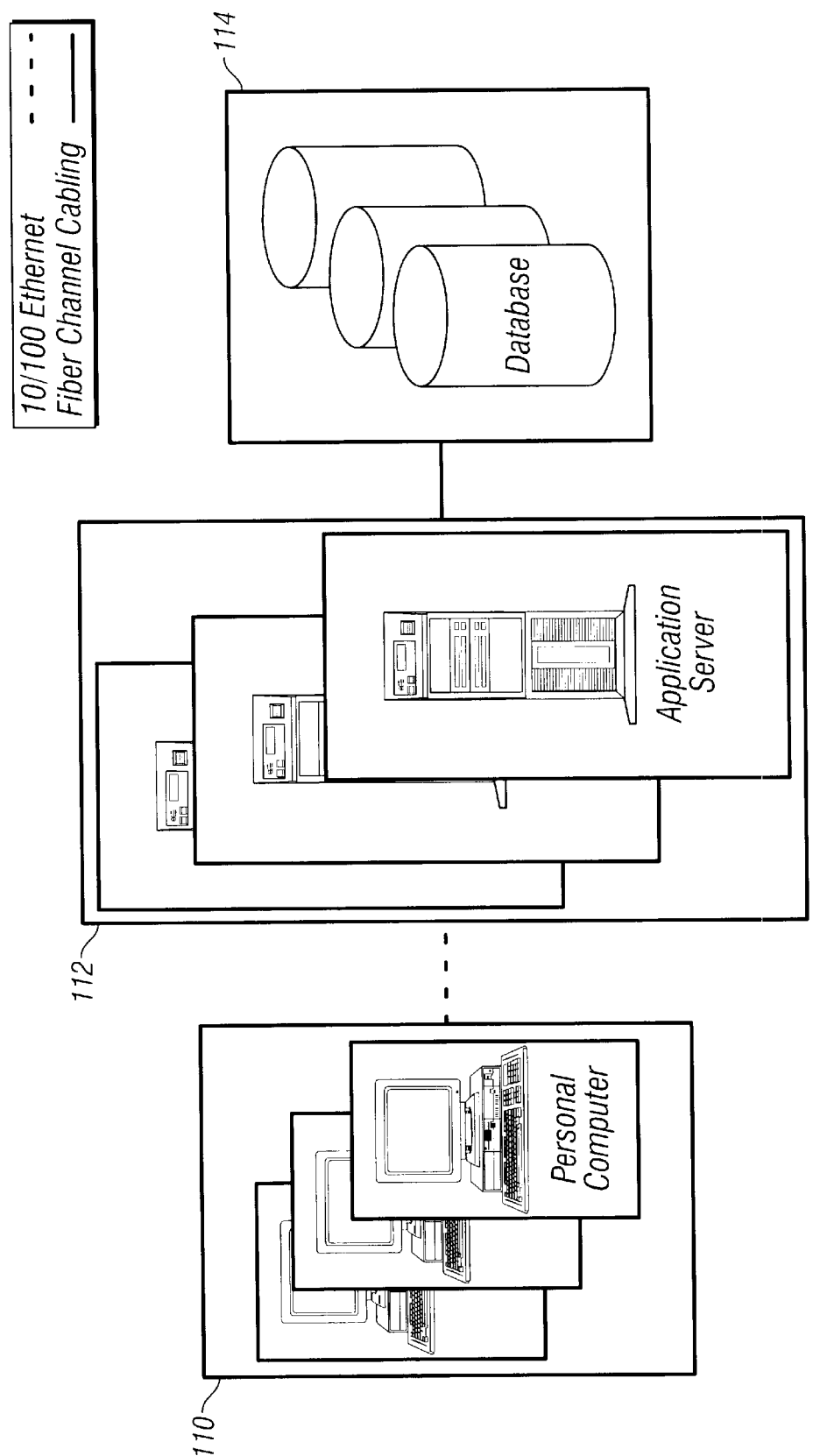
FIG. 1b is a schematic diagram of the system architecture of the present invention showing an alternate embodiment.

As would be apparent to one of ordinary skill in the art, the individual tiers of the client-server system shown in FIG. 1a could be any number of connected components. FIG. 1b illustrates this concept, showing a plurality of PCs 110 connected to a plurality of application servers 112, which are connected to a plurality of databases 114.

Method of the Present Invention

Figure 2:
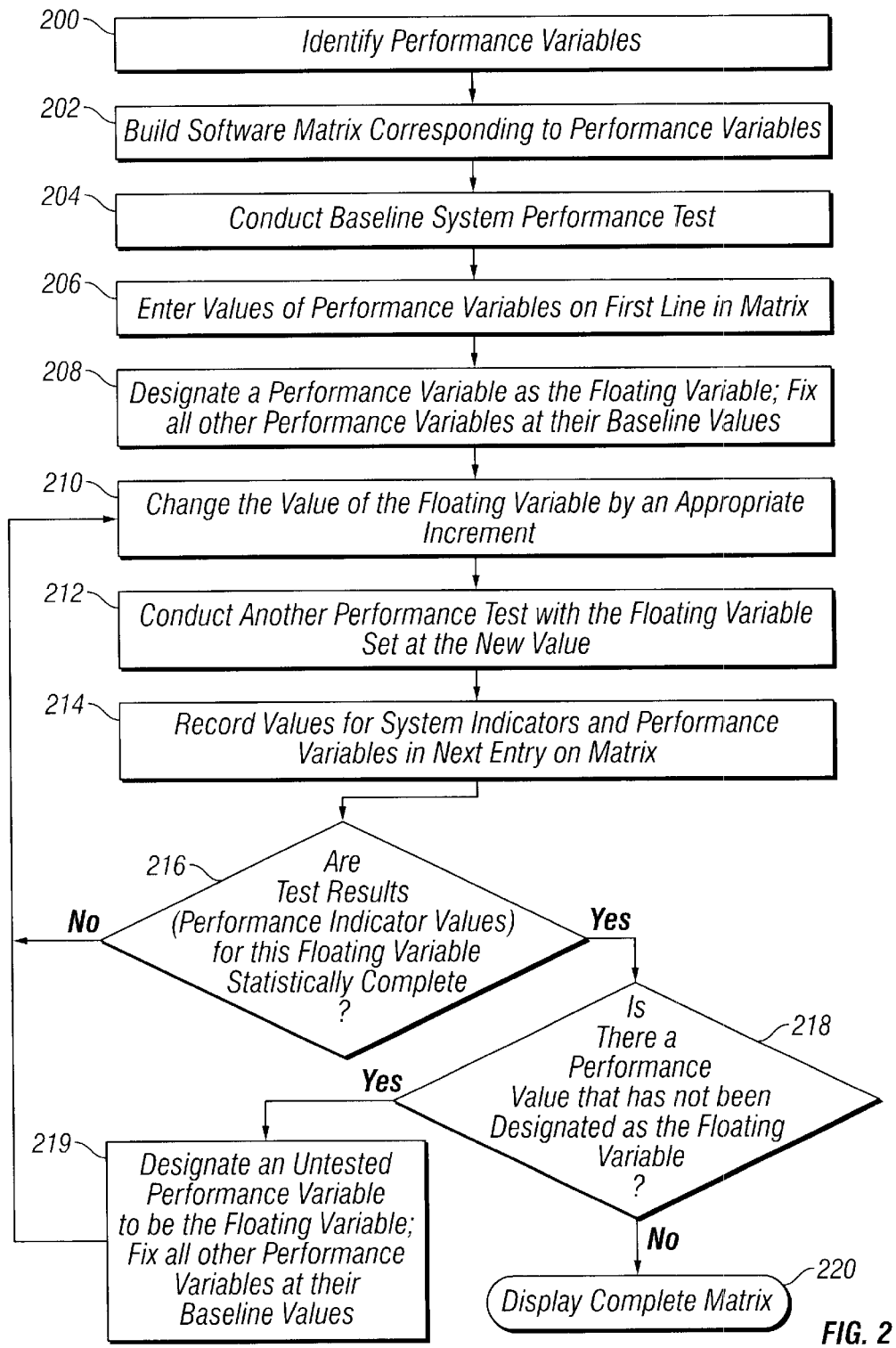
FIG. 2 is a flowchart tracing the steps of the present invention.

FIG. 2 is a flowchart outlining the steps of the present invention. While the method described herein and illustrated in the flowchart contains many specific examples of program steps, these program steps should not be construed as limitations on the scope of the invention, but rather as examples of program steps that could be used to practice the invention. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

In step 200, performance variables are listed for each component of the system, including the hardware, the software, and the application. As would be apparent to one skilled in the art, these performance variables correspond to the variables affecting performance of the individual system components. These variables are discussed in more detail below. Using the list of performance variables, a software matrix is built in step 202. The performance variables are entered into the software matrix as headings under which values of the variables are listed. In addition to performance variables, the matrix includes headings for system performance indicators, such as the time to complete transactions or the time per processing cycle.

In step 204, a baseline performance test is conducted that is representative of the operations for which the system was designed. This initial test documents the baseline performance of the system after it has been made functional, but not optimized. The values of the performance variables for this initial test are noted on the first line in the software matrix, in step 206. This entry in the matrix represents the benchmark against which the subsequent performance tests will be measured. Thus, a system designer can assess the relative impact of one performance variable by changing the values of the performance variable and observing whether the system performance improves over or falls below that of the benchmark test.

In step 208, a performance variable on the matrix is designated to be the floating variable and all other performance variables are fixed at their respective benchmark values. Then, in step 210, the value of the floating performance variable is changed by an appropriate increment. As used herein in this specification and the claims, an appropriate increment means a change in value corresponding to a unit of measure of the performance variable and an amount (either increasing or decreasing) that could have a measurable effect on overall system performance. As an example of an appropriate increment, a variable could be increased in 25% increments until the variable reaches its maximum allowable value or the system becomes unstable, whichever occurs first. In step 212, another performance test is conducted with the floating performance variable set at the new value. This test returns a new set of values for the system performance indicators. In step 214, these indicators, along with the values of the performance variables, are recorded in the next entry of the matrix.

In step 216, the test returns for the current floating variable are examined to determine if any patterns are evident and if a statistically complete sample of tests has been taken. If the sample of tests is statistically incomplete, the method of the present invention returns to step 210 and changes the value of the floating performance variable an appropriate increment, conducts another performance test (step 212), and records the resulting values of the performance variables and performance indicators in the matrix (step 214). Based on the decision in step 216, steps 210 through 216 repeat until the matrix contains enough entries to demonstrate system performance patterns or relationships between performance variables and performance indicators.

If testing for a particular floating variable is complete, the method moves onto step 218 and determines if a performance variable has yet to been designated as the floating variable. If there is an untested performance variable, in step 219, that untested performance variable is designated as the floating variable and the previous floating variable is returned to its original benchmark value. By returning the previous floating variable to its original benchmark value, the present invention preserves the integrity of the tests and prevents other variables from causing confusion in interpreting results. With the newly designated floating variable, the method of the present invention returns to step 210 and repeats steps 210 through 216 as many times as required for the new floating variable.

When tests have been conducted for every performance variable, step 218 is answered "no" and the matrix is complete. In step 220, the complete matrix is displayed for the system designer. The matrix shows trends in system performance as a function of the performance variables, illustrating clear causal relationships between system performance and specific system variables. The values of the performance variables that maximize system performance are the optimal values. Thus, the system designer can understand the relative impacts of the performance variables and, in turn, can choose optimal values of the performance variables to modify the system and optimize performance.

Optionally, the system designer can repeat the method of the present invention by changing the benchmark values of the floated variables to their new, optimized values and repeating the tests. Thus, all variables would be set to the optimized values ascertained in the first round of tests. Then, each variable would be allowed to float from its first round optimized value according to the method described above. Preferably, before starting a second round of tests, the system designer would ensure that the system is operating properly at the new, optimized variable values and that the system is not unstable. Additional rounds of testing can be repeated in this manner until a system resource is exhausted, e.g., the number of CPUs, the amount of memory, or the amount of disk storage.

The above flowchart steps can be executed manually or by automatic software manipulation. To execute manually, a designer would set up the matrix on paper or in a computer spreadsheet, and would manually enter the information after each trial. The designer would also choose the incremental changes to the floating variable for each test. To execute the steps using automated software, the software would automatically change the value of the floating variable, run the test, and record in the matrix the performance indicator values and the performance variable values. The software could also use a statistical algorithm to determine if an adequate sample of tests has been taken for a particular performance variable and if any trends or patterns have been uncovered. In this way, the software could automatically decide when to move on to the next performance variable and when all of the performance variables have been sufficiently tested.

To automatically alter variables that involve hardware changes, such as the number of CPUs, multiple hardware components would be connected to the computer network system and the software would activate the number of components that it is currently testing. For each successive test, the software would activate the next increment of the number of components.

As apparent to one skilled in the art, invoking the automated software embodiment of the present invention would involve scripting the flowchart process in a testing utility, such as PurePerformix™. The initial exercise of identifying the performance variables would still be completed by a system designer and entered into the testing utility.

FIG. 3 shows an example of a matrix for recording the values of performance variables and system performance indicators. As explained above, the first entry (row) is the initial benchmark test that records the values of performance variables and system performance indicators just after the programming problems have been resolved and the system has been made operational. For the example shown in FIG. 3, a, b, c, d, f, g, j, and k represent the baseline values for the performance variables, while m and n are the baseline values for the performance indicators.

Below the benchmark test, each entry documents a different test trial (from 1 to N), recording the values for system performance indicators and performance variables. The matrix also notes which performance variable is the floating variable, i.e., which variable is at a value different than its benchmark value. In the example, for test number 1, the floating variable is "# of CPUs," and the value of that variable has been changed from a to 2 to yield new values, m1 and n1, for the performance indicators. By grouping the tests according to the floating variable, the matrix conveys the relationship between system performance (indicators) and the values of the floating variable. For instance, as the "# of CPUs" changes from a to 8, the matrix demonstrates trends from m to m3 and n to n3.

Similarly, the matrix shows a subsequent performance test using a different floating variable. For test number 100 and 101, the "# of CPUs" is returned to its baseline value a, and the "# of Records" is designated as the floating variable. Thus, for "# of Records" equaling 200 and 500, the matrix demonstrates trends in the performance indicators from m100 to m101 and n100 to n101, respectively.

In a further preferred embodiment of the present invention, this matrix is translated into a graph that illustrates these relationships. As with the matrix, this graph can be produced manually by the system designer or automatically with software.

Performance Variables

In any given computer network system, there are on the order of 200–600 variables that affect end-to-end processing performance. Identifying these variables depends largely on the specific architecture, components, and application of a computer network system. Generally though, the performance variables fall under four categories: environment variables, database variables, application variables, and network variables. Environment variables include parameters such as log checkpoints, cluster locks, number of CPUs, amount of memory, amount and type of direct access storage devices (e.g., JBOD (just basic old disk) storage devices or EMC Corporation storage devices), cache size, data striping, port configurations, swap space, LVG (logical volume group), spinlocks (memory latch), data segment size, maximum number of users, number of file locks, and number of processes. Database variables include parameters such as system global area (SGA) size, redo logs, sort area, shared pools, parallel queries, rollback settings, users per tablespace, buffer size, hash joins, and maximum number of database files open. Application variables include parameters such as transaction mix, transaction rate, array insert size, number of concurrent customers, number of records, and number of history files. Network variables include parameters such as protocols, local area network bandwidth, wide area network bandwidth, and server to database bandwidth.

Performance Indicators

The performance indicators provide a quantifiable measure of performance that facilitates the comparison of test trials. A performance indicator could be any measurable operation of a computer network system. Deciding which performance indicator to test for depends upon the goals of the application and the limitations on available network resources. For example, if customer satisfaction is the goal and the application involves an interaction with the customer, either directly (by internet, for example) or indirectly (through a customer service representative, for example), then the ability to process a transaction quickly would be the relevant question and transaction rate (the time to complete a transaction) would be the logical performance indicator.

In the preferred embodiment of the present invention, the performance indicator is transaction rate or batch rate (the time to complete a batch processing cycle). Among the several variables listed under performance variables, it is important to note that any one variable could be designated as a performance indicator, in which case all of the other performance variables would be fixed except for the floating variable, and a test would return a result for the performance variable designated as the performance indicator. One example of a performance variable designated as a performance indicator is the transaction rate.

To test the transaction rate, the performance test executes a preset scripted file of canned transactions. A software utility measures the average elapsed time to complete transactions and records the transaction rate in the matrix. To test the batch rate, the performance test executes a batch processing cycle, e.g., processing customer records and compiling corresponding bills. The test inputs a fixed number of customer records into the batch cycle and records the time it takes to compile the bills. In addition to individual tests, both the transaction rate and batch rate tests could be performed and compared to each other to understand how they each are affected by the performance variables and if they are affected in opposite ways. In this manner, if a computer network system supports both transaction and batch processing, the system is optimized by determining which performance variable setting produces the best possible combination of transaction and batch processing performance.

EXAMPLES

The following examples illustrate the method of the present invention and the beneficial insights obtained from the method. The examples are provided to illustrate certain embodiments of the present invention and are not to be construed as limiting the invention in any way. Each example tests a client-server based computer network system executing a Bill Computation and Customer Care Application. The heading for each example indicates the performance variable that was designated as the floating variable.

Amount of Memory:

This example examines the effects of increased memory on batch rate and transaction rate. Starting from a benchmark value of 2 megabytes, the memory is increased to 4 megabytes and then 8 megabytes. A batch processing performance test and a transaction processing performance test is conducted at each of these memory levels. The resulting matrix for each group of tests reveals that memory does not have a substantial effect on batch processing but does have a significant impact on transaction rate. Presented with these relationships, a system designer would understand that a server that handles batch processes requires a different memory configuration than a server that handles transactions. In addition, if a server handles both transactions and batch processing, then a system designer would have to balance the memory configuration resources between the two processes, e.g., the system designer would set system parameters to allocate fixed percentages of memory to each process to prevent uncontrolled use of memory by either process.

Number of Concurrent Users:

This example examined the effects of increasing the number of concurrent users on transaction rate. As described above for transaction rate performance tests, a preset file of canned transactions was entered into the system for each successive number of concurrent users. Starting from a benchmark value of 500, the number of concurrent users for each test was increased as follows: 500, 600, 1000, 1200, 1500, and 2000. For each increase up to about 1,200 concurrent users, the average transaction rate, or time required to complete a transaction, increased in a roughly linear form. However, once the number of concurrent users exceeded 1,200, the transaction rate became markedly increased. For numbers of users beyond 1,200, the transaction rate was wildly unpredictable and far from the linear form it displayed initially. Memory usage was observed to approach 100% for 1,200 users, while CPU usage remained below 50%. Memory usage remained below 50% for users beyond 1,200. In this particular case, the system designer concluded that the database, which serviced the attached users, may have been causing the erratic transaction rate because it consumed memory based on the number of attached users and not on the volume of transactions being processed.

Transaction Server-to-Database Server Bandwidth:

This example investigated the effect of transaction server-to-database server bandwidth on transaction rate. The network system executed a preset file of canned transactions for increasing values of transaction server-to-database server bandwidth. The bandwidth was incrementally raised from 10 megabytes to 100 megabytes. The matrix revealed no appreciable increase in performance, i.e., transaction rate. Network utilization was observed to be well below 50% in all cases. Therefore, for this Bill Compilation and Customer Care application, the input-output (IO) data transmission between the transaction server and the database server was not a factor in limiting end-to-end processing performance.

Having determined that the system was not IO-bound in the bandwidth between the transaction server and the database server, later performance tests proved that the system was processing-bound, i.e., the primary destabilizer was the number of records to be processed. Enlightened by this finding, a system designer could optimize the system simply by installing new faster-processing hardware.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for benchmarking and optimizing end-to-end processing performance of a computer network system, wherein the computer network system is a client-server based computer network system composed of individually manufactured components, the method comprising:

(a) selecting system performance variables and running a baseline performance test using an initial set of values for the system performance variables to produce a benchmark system performance;

(b) fixing the system performance variables at the initial set of values;

(c) selecting a floating variable from among the system performance variables;

(d) running subsequent tests with the floating variable set to different values, recording system performance indicators that result from each subsequent test, comparing the system performance indicators to the benchmark system performance, and recording an optimal value of the floating variable that optimizes the system performance indicators;

(e) selecting another floating variable, from among remaining system performance variables that have not yet been selected to be the floating variable;

(f) repeating steps (d) and (e) until all the system performance variables have been selected as the floating variable; and (g) fixing each of the system performance variables to its optimal value.

2. The method of claim 1, wherein the system performance variables are a set of system destabilizers that influence software processes, hardware processes, and network processes of the computer network system.

3. The method of claim 1, wherein the system performance indicators are selected from the group consisting essentially of processing speed, system access, system congestion, system response time, transaction rate, and batch rate.

4. The method of claim 1, wherein the subsequent tests continue until the system performance indicators show that a relationship does or does not exist between the floating variable and the system performance indicators, and show the relationship to a degree of accuracy required by an application of the computer network system.

5. The method of claim 1, wherein the computer network system is a personal computer connected to a server and a database.

6. The method of claim 1, wherein the different values to which the floating variable is set are determined by changing the floating variable an amount that could have a measurable effect on the performance of the computer network system.

7. The method of claim 1, wherein the different values are obtained by increasing the floating variable appropriate increments until either the floating variable reaches a maximum allowable value or the computer network system becomes unstable.

8. A method for benchmarking and optimizing end-to-end processing performance of a computer network system, wherein the computer network system is a client-server based computer network system composed of individually manufactured components, the method comprising:

(a) identifying a plurality of performance variables and a plurality of performance indicators associated with the computer network system;

(b) testing the performance of the computer network system and recording in a matrix a baseline value for each performance variable of the plurality of performance variables and a baseline value for each performance indicator of the plurality of performance indicators;

(c) choosing a floating performance variable from the plurality of performance variables, wherein the floating performance variable is a performance variable that has not yet been tested;

(d) changing the baseline value of the floating performance variable to a new value and fixing each performance variable of the remaining performance variables in the plurality of performance variables at their baseline values;

(e) testing the performance of the computer network system and recording in a floating performance variable section of the matrix the baseline value of the performance variable, the new value of the floating performance variable, a test result value for the each performance indicator, and an optimal value of the floating performance variable if the new value of the floating performance variable optimizes the test result value for the each performance indicator;

(f) returning to changing the baseline value and fixing each performance variable, unless the floating performance variable section shows a presence or absence of a relationship between the floating performance variable and the plurality of performance indicators;

(g) returning to choosing a floating performance variable unless the computer network system has already been tested for all the floating performance variables; and (h) after all performance variables have been tested, setting the each performance variable of the plurality of performance variables to its optimal value.

9. The method of claim 8, wherein identifying the plurality of performance variables comprises analyzing an architecture, a set of components, and an application for which the computer network system was designed, and identifying environment variables, database variables, application variables, and network variables.

10. The method of claim 9, wherein the environment variables measure a physical configuration of the computer network system and the set of components, wherein the database variables measure database configuration and database operation, wherein the application variables measure the application for which the computer network system was designed, and wherein the network variables measure methods of data exchange among the set of components.

11. The method of claim 8, wherein the plurality of performance indicators comprises a batch rate and a transaction rate.

12. The method of claim 8, wherein the new value is determined by increasing the floating performance variable an appropriate increment.

13. The method of claim 8, wherein the computer network system has an application tier, a database tier, and a client tier.

14. The method of claim 8, wherein an automated software application executes the method.

15. The method of claim 8, wherein recording in a floating performance variable section of the matrix an optimal value of the floating performance variable if the new value of the floating performance variable optimizes the test result value for the each performance indicator comprises:

(i) displaying the matrix;

(ii) plotting on a graph the plurality of performance indicators as a function of the plurality of performance variables; and (iii) determining relationships between the plurality of performance variables and the plurality of performance indicators.

16. A method for benchmarking and optimizing end-to-end processing performance of a computer network system, wherein the computer network system is a client-server based computer network system composed of individually manufactured components, the method comprising:

(a) identifying performance variables that affect the performance of the computer network system;

(b) running an initial performance test on the computer network system after the computer network system has been made functional, wherein the initial performance test measures performance indicators as a function of the performance variables;

(c) recording baseline values of the performance variables and the performance indicators in a matrix;

(d) designating a first performance variable to be a floating variable and setting the performance variables, except for the first performance variable, to the baseline values;

(e) changing the floating variable to a new value, conducting a next performance test on the computer network system, recording test values of the performance indicators in the matrix, and recording the new value as an optimal value if the new value optimizes the test values, until the matrix is statistically complete for the floating variable;

(f) if one performance variable of the performance variables has yet to be designated as the floating variable,
   (i) designating the one performance variable to be the floating variable,
   (ii) setting the performance variables, except for the one performance variable, to the baseline values, and
   (iii) repeating steps (e) and (f); and (g) after all performance variables have been designated as the floating variable, setting each of the performance variables to its optimal value.

17. The method of claim 16, further comprising setting each of the baseline values of the performance variables equal to its optimal value and repeating steps (a) through (h).

18. A method for benchmarking and optimizing end-to-end processing performance of a computer network system using an automated software application, wherein the computer network system is a client-server based computer network system composed of individually manufactured components, the method comprising:

(a) running a baseline performance test on the computer network system, the baseline performance test producing baseline values of performance variables and baseline values of performance indicators, and storing in memory the baseline values of the performance variables and the baseline values of the performance indicators;

(b) fixing the performance variables to the baseline values;

(c) selecting a floating variable from among the performance variables;

(d) running a floating variable performance test comprising:
   (1) computing incremental values of the floating variable,
   (2) running incremental tests with the floating variable set to the incremental values, the incremental tests producing incremental performance indicators,
   (3) recording in memory the incremental values and the incremental performance indicators, and
   (4) determining from among the incremental values an optimal value,
   wherein the incremental tests are run until the incremental performance indicators are statistically complete;

(e) repeating the floating variable performance test with each of the performance variables designated as the floating variable until all of the performance variables have been the floating variable; and (f) fixing the each of the performance variables to its optimal value.

19. The method of claim 18, wherein computing the incremental values comprises calculating a change in value that corresponds to a unit of measure of the performance variables and an amount that could have a measurable effect on the performance indicators.

20. The method of claim 18, wherein the incremental performance indicators are statistically complete when the incremental performance indicators demonstrate that a relationship between the floating variable and the performance indicators does or does not exist, to a degree of accuracy required by a specific application of the computer network system.

21. The method of claim 18, wherein determining the optimal value comprises identifying a value that most improves the incremental performance indicators in relation to the baseline values of the performance indicators.

* * * * *